Sept. 8, 1959  F. D. BARBER  2,903,306
SEAL RING FOR JOURNAL BEARING
Filed Oct. 28, 1957
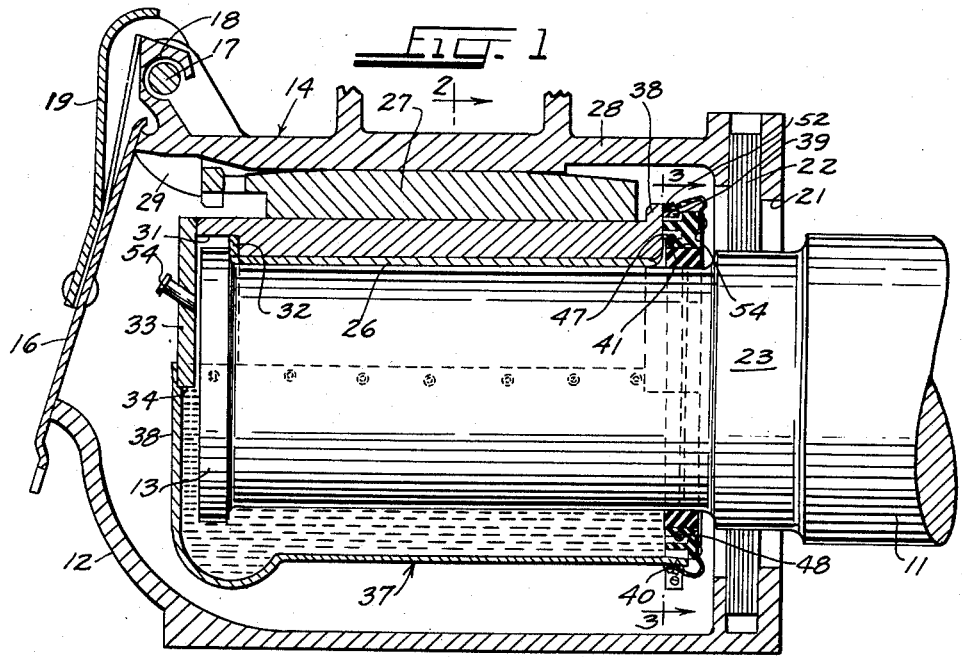
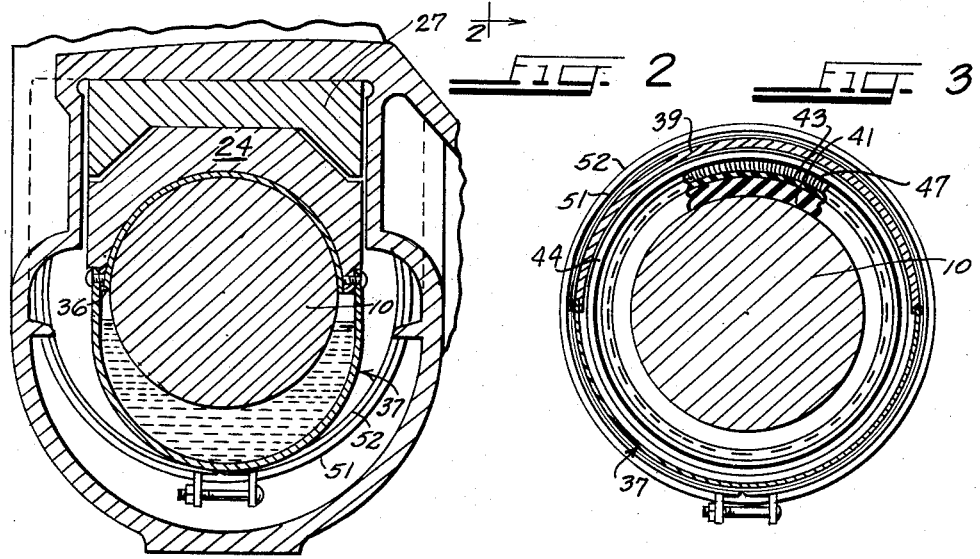
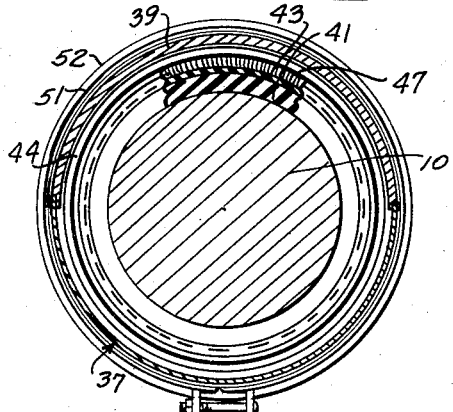
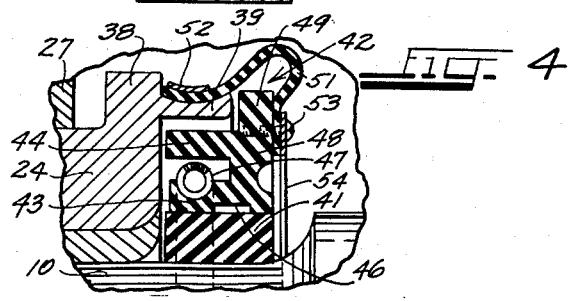
INVENTOR.
FRANKLIN D. BARBER
BY

United States Patent Office 2,903,306
Patented Sept. 8, 1959

2,903,306
SEAL RING FOR JOURNAL BEARING

Franklin D. Barber, Flossmoor, Ill., assignor to Standard Car Truck Company, Chicago, Ill., a corporation of New Jersey Application October 28, 1957, Serial No. 692,837

3 Claims. (Cl. 308—83)

This invention relates to improvements in seal ring structures and has for its principal object the provision of an improved seal ring structure which makes it practicable to employ continuous non-split sealing rings on rotatable shafts and journals provided with circular ribs or other protuberances which project outwardly from the surface on which such seal ring structure is to be fitted.

Heretofore, considerable difficulty has been experienced in providing a leak proof oil seal for use in connection with lubricant reservoirs of the general class which enclose the axle journals of a railway car. In such case it is desirable to seal the inner end of such reservoir by means of a seal ring structure fitted on the highly polished journal surface rather than other parts of the axle which are less carefully formed and therefore are rough and of irregular contour as compared to the uniformly smooth bearing surface of the journal. The outer end of the journal, however, is provided with a thrust collar of greater diameter than that of the bearing surface of the journal. It has been customary, therefore, to utilize split ring or segmental ring structures which may be fitted to the surface of the journal without passing the seal elements over said thrust collar.

A specific object of the present invention is to provide a simplified seal ring structure which overcomes the above mentioned difficulties in connection with the provision of a sealed axle journal for a railway car. While the invention has been developed with particular reference to specific object herein mentioned, the bearing ring structure is suitable for use in many other situations where similar problems prevail. Therefore, it should be understood that the invention is not limited to the structure herein shown except where the claims are expressly so limited.

According to the broad aspect of the invention, the seal ring structure includes an elastic band adapted to be stretched or expanded over the said thrust collar of a car journal or other similar obstruction. The band, by virtue of its elasticity, constricts its diameter so as to tightly grip the smooth polished surface of the journal or other revolvable shaft and thereby provides a smooth bearing surface of regular contour for an outer ring element of greater rigidity than the elastic band. The outer diameter of the elastic band, when it is in its applied position, is such that the more rigid ring element may be readily slipped over the said collar or other obstruction on the journal or shaft on which the seal structure is being installed and thereafter fitted on the resilient band. In the specific structure herein illustrated a suitably flexible wall connects the outer ring elements to the lubricant reservoir so as to close the end of the lubricant reservoir.

Among the objects of this invention is the provision of a seal ring structure of the character outlined above which is simple in construction, efficient in function and relatively easy to install in its operative position.

Other and further objects and advantages of this invention will become apparent from the following description when considered in connection with the accompanying drawings in which:

Fig. 1 is a longitudinal cross-sectional view through a rail car journal box showing a journal lubricant reservoir and the improved seal ring structure applied to the end of the axle journal;

Fig. 2 is a cross-sectional view taken substantially on line 2—2 of Fig. 1;

Fig. 3 is a cross-sectional view taken substantially on line 3—3 of Fig. 2; and

Fig. 4 is an enlarged cross-sectional view showing details of construction.

Referring to the drawings, a lubricating reservoir is shown as being applied to the journal 10 of a conventional wheel axle 11 within a journal box 12 of a railway car truck. The axle journal 10 is of conventional construction being formed with a thrust collar or end flange 13. The journal box 12 also is of standard conventional construction and is here shown as integrally cast with portions of a truck side frame 14. The journal box 12 is provided with an outer open end which is closed by the usual closure member 16 pivotally supported on a pin 17 supported on lugs 18 integral with the journal box. Suitable spring means 19 is provided for maintaining the closure member either in its fully opened or fully closed position.

The inner end of the journal box 12 is formed with an opening 21 through which the axle journal 10 projects inwardly into the journal box. The inner end of the journal box is slotted vertically to receive a dust guard 22 which is adapted to bear against the dust guard bearing area 23 of the axle journal to exclude foreign matter from the interior of the journal box.

A journal bearing member 24 of brass provided with a liner of babbitt 26 or like bearing material is formed in cross-section as illustrated in Fig. 2 and engages the upper half of the axle journal 10. A wedge member 27 is interposed between the bearing member 24 and the top 28 of the journal box and has its outer end bearing against an abutment 29 formed integrally with the outer end of the journal box. The outer end of the bearing member 24 is provided with a recess 31 which provides clearance for accommodating the end flange 13 of the axle journal 10. An arcuately formed thrust member 32 is interposed between the vertical wall of the recess 31 and the end flange 13 and serves to limit the degree of axial shifting movement of the bearing member 24 relative to the axle journal 10. It is desirable to limit the axle movement of the bearing member 24 in the specific structure herein shown, since the sealing structure is fitted on the journal surface, intermediate the bearing member 24 and a shoulder at one end of the journal. Therefore, a thrust plate 33 is suitably welded to the outer end of the bearing member 24 and serves to limit any outward relative movement between the axle journal and the bearing member 24. The lower edge 34 of the thrust plate 13 terminates slightly below the lower longitudinal edges of the bearing member 24 which are provided with inwardly offset flanges 36 to receive the lubricant reservoir, indicated generally by the numeral 37, as will be hereinafter fully explained. The inner end of the bearing member 24 is provided with a flange 38 which serves as an abutment to engage with the wedge 27 and limit the movement of the bearing member 24 relative to the wedge. The inner face of the bearing member 24 is provided with a longitudinally projecting arcuate flange 39 for a purpose as will be hereinafter explained.

The lubricant reservoir 37 is adapted to maintain at all times an adequate supply of lubricant therein for application to the axle journal 10. The reservoir is adapted to be suspended from the bearing member 24 and may be formed of any suitable rigid, semi-rigid or flexible material such as sheet metal, molded plastic or rubber resistant to oil. In the present disclosure the reservoir is illustrated as constructed of sheet metal or other rigid material, since it is sufficiently inherently rigid so as not to require additional reinforcement.

The lubricant reservoir 37 is generally of a trough-like semi-cylindrical construction and includes at the outer end a front wall 38 which is secured to the lower edge of the thrust plate 33 in sealing engagement therewith, in any suitable manner, as for example by means of screws or other fastening means. The upper longitudinal edges of the reservoir 37 are secured as by means of screws to the vertical faces of the recessed flanges 36 of the longitudinal edges of the bearing member 24 in substantial liquid sealing engagement therewith to prevent the egress of oil from the reservoir.

The inner end of the lubricant reservoir 37 is open and the marginal edge 40 thereof is preferably flared out to a slight degree so as to rigidify the marginal portion. The said inner end of the lubricant reservoir is adapted to be sealed by means of the present invention against the egress of lubricant from the reservoir along a surface area on the axle journal adjacent the dust guard bearing 23.

The sealing ring structure of the present invention comprises two cooperating principal parts, the first being an annular band 41 of resilient and elastic oil resistant material, such as for example silicon rubber. The sealing band 41 is of generally rectilinear shape in cross-section and when applied on the surface of the axle journal 10 is maintained in tension so as to hug the surface of the axle journal and rotate therewith. The second part comprises an annular member 42 having a circular opening sufficiently large to pass over the end flange 13. The said member is shaped substantially in cross-section as illustrated in Fig. 4, and includes two spaced flanges 43 and 44 directed outwardly or towards the interior of the lubricant reservoir 37. The said flanges are arranged concentrically and the inner flange 43 is provided on its face thereof with an annular recess 46 intermediate the edges thereof so as to form two spaced bearing areas which engage the peripheral surface of the sealing band 41. A garter spring 47 is partially embedded in the lower flange 43 and also extends into the void between the two flanges and serves to yieldingly maintain the bearing surfaces of the flange 43 in engagement with the peripheral surface with the sealing band 41. As will be apparent, the provision of the void between the two flanges 43 and 44 serves to enhance the flexibility of the sealing member 42. The two flanges 43 and 44 are integrally connected with a vertical portion 48 terminating in a radially directed flange 49 which has connected to the inner vertical face thereof a diaphragmatic sleeve 51 of oil resistant material, such as neoprene. The opposite marginal edges of the said sleeve are clamped coextensively against the flange 39 of the bearing member 24 and the flared marginal lip 40 of the lubricant reservoir as by a split clamping band 52 which maintains the outer marginal edge of the diaphragmatic sleeve in sealing engagement with the flange 39 and arcuate lip 40 of the lubricant reservoir. As will be seen more clearly by reference to Fig. 4, the diaphragmatic sleeve is attached to the sealing member 42 in sealing engagement therewith as by a series of screws 53 cooperating with an annular ring member 54.

It will be seen from the foregoing description that the sealing band 41 is normally contracted against the periphery of the axle journal 10 and may rotate therewith, while the concentric cooperating sealing member 42 is normally contracted by the garter spring 47 against the periphery of the said sealing band. Thus, a highly effective seal is provided against the escape of lubricant from the reservoir while at the same time permitting relative movement between the sealing band 41 and the outer sealing member 42 as well as preventing the ingress of foreign matter into the lubricant reservoir. The diaphragmatic sleeve 51 permits limited axial shifting movement of the axle journal 10 relative to the bearing member 24 and the lubricant reservoir attached thereto.

In the initial installation of the lubricant reservoir and sealing means of my invention the axle is removed from the journal box by the usual procedure and the sealing band 41 is slightly stretched sufficient to permit it to pass over the end flange 13 of the axle journal 10. Thus, when the sealing band 41 is applied to the axle journal, as indicated in Fig. 1, it is contracted thereon. The outer sealing member 42 is then passed easily over the end flange 13 of the axle journal 10. The garter spring 47 serves to maintain the flange 43 in intimate sealing engagement with the sealing band 41. Thereafter the bearing member 24 is applied in its operative position and the lubricant reservoir 37 is attached to the bearing member 24 and to the thrust plate 33. The diaphragmatic sleeve 51 having been previously attached to the sealing member 42 is clamped along its outer marginal edges to the flange 39 and marginal lip portions 40 of the lubricant reservoir by means of the split clamp ring 52. The assembled bearing and lubricant reservoir now completely enclose the axle journal and may finally be passed through the inner opening 21 of the journal box to a position within the journal box in the usual manner. The wedge 27 may then be inserted into the journal box through the front opening in the conventional manner of installation.

When the parts are assembled in their final positions within the journal box, the lubricant reservoir 37 may be filled with lubricant through a filling opening 54 provided in the closure member 16. It will be apparent that with lubricant at the proper level, the lubricant will be carried to the bearing surface of the liner 26 upon rotation of the axle journal.

The invention has been described with particular reference to its application in a railway car journal bearing. However it will be apparent that the invention is of much broader scope and is useful in any application wherein it is required to provide an efficient seal for a reservoir disposed in cooperation with a rotating shaft where the shaft has an enlargement such as a flange either at the end or at some intermediate place.

I claim:

1. The combination with a railway car axle journal having a flange at one end and a dust guard shoulder at the other end, both of which are of greater diameter than the said journal, a bearing member positioned on the journal in spaced relation to said dust guard shoulder, and a lubricant reservoir suspended from said bearing and cooperating therewith to enclose said journal and flange, of means for sealing the inner ends of said reservoir and bearing comprising a continuous band of resilient and elastic material adapted to be expanded to pass over said flange and thereafter contract into fixed sealing engagement on the journal between said bearing and said dust guard shoulder, a continuous sealing ring of oil resisting material having some resilience and having sufficient inner diameter, without expansion thereof, to pass over said flange and having a movable sealing fit on the outer periphery of said resilient elastic band, means for compressing a portion of the sealing ring against the periphery of said elastic band, and a flexible wall for attaching the sealing ring to the inner end of said bearing and the inner end of said reservoir.

2. The combination seal for a lubricant reservoir and journal bearing according to claim 1 wherein the vertical thickness of the elastic band is at least equal to the height of said flange relative to the surface of the journal.

3. The combination seal for a lubricant reservoir and journal bearing according to claim 2, wherein the said sealing ring is provided with an integral radial flange for attachment to said flexible wall.

References Cited in the file of this patent

UNITED STATES PATENTS

| | | |
|---|---|---|
| 2,192,305 | Gilman | Mar. 5, 1940 |
| 2,714,023 | Hennessy | July 26, 1955 |
| 2,714,046 | Barber | July 26, 1955 |